United States Patent
Wang et al.

(10) Patent No.: US 12,240,969 B2
(45) Date of Patent: Mar. 4, 2025

(54) POLYPROPYLENE COMPOSITION WITH IMPROVED PROCESSABILITY AND IMPACT STRENGTH

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Linz (AT)

(73) Assignee: BOREALIS AG, Vienna (AT)

( * ) Notice: Subject to any disclaimer, the term of this patent is extended or adjusted under 35 U.S.C. 154(b) by 260 days.

(21) Appl. No.: 17/771,219

(22) PCT Filed: Oct. 22, 2020

(86) PCT No.: PCT/EP2020/079753
§ 371 (c)(1),
(2) Date: Apr. 22, 2022

(87) PCT Pub. No.: WO2021/078861
PCT Pub. Date: Apr. 29, 2021

(65) Prior Publication Data
US 2022/0389204 A1 Dec. 8, 2022

(30) Foreign Application Priority Data

Oct. 23, 2019 (EP) .................................... 19204928

(51) Int. Cl.
*C08L 23/14* (2006.01)
*B29B 7/90* (2006.01)
(Continued)

(52) U.S. Cl.
CPC .............. *C08L 23/142* (2013.01); *B29B 7/90* (2013.01); *B29B 9/065* (2013.01);
(Continued)

(58) Field of Classification Search
CPC ............. H10K 50/8426; H10K 50/865; H10K 59/8722; H10K 59/873; H10K 59/8792;
(Continued)

(56) References Cited

U.S. PATENT DOCUMENTS

2012/0190784 A1* 7/2012 Posch ..................... C08L 23/10
524/495

FOREIGN PATENT DOCUMENTS

EP       3357964 A1    8/2018
JP    2018529810 A   10/2018
(Continued)

OTHER PUBLICATIONS

International Application No. PCT/EP2020/079753, "International Search Report", mailed Jan. 20, 2021, 3 pages.

*Primary Examiner* — Nathan L Van Sell
(74) *Attorney, Agent, or Firm* — COZEN O'CONNOR

(57) ABSTRACT

The present invention relates to heterophasic polypropylene compositions comprising a propylene homo- or copolymer forming a crystalline fraction as a matrix and an amorphous propylene ethylene elastomer as a soluble fraction dispersed in said matrix. The heterophasic polypropylene compositions further comprise an elastomeric ethylene/alpha-olefin random copolymer. The heterophasic polypropylene compositions have a well-balanced relation between stiffness and impact strength, low volatile and semi-volatile emissions and good processability.

15 Claims, 1 Drawing Sheet

(51) Int. Cl.
  *B29B 9/06* (2006.01)
  *B29C 45/00* (2006.01)
  *B29K 23/00* (2006.01)
  *B29K 105/16* (2006.01)
  *B29K 509/02* (2006.01)
  *B29L 31/00* (2006.01)
  *B29L 31/30* (2006.01)
  *C08J 3/00* (2006.01)

(52) U.S. Cl.
  CPC ........... *B29C 45/0001* (2013.01); *C08J 3/005* (2013.01); *B29K 2023/12* (2013.01); *B29K 2105/16* (2013.01); *B29K 2509/02* (2013.01); *B29L 2031/30* (2013.01); *B29L 2031/712* (2013.01); *C08J 2323/14* (2013.01); *C08J 2423/08* (2013.01); *C08J 2423/14* (2013.01); *C08L 2203/30* (2013.01); *C08L 2205/025* (2013.01); *C08L 2205/03* (2013.01); *C08L 2207/02* (2013.01); *C08L 2314/02* (2013.01)

(58) Field of Classification Search
  CPC ........... B32B 3/266; B32B 7/12; B32B 15/08; B32B 2255/26; B32B 2264/108; B32B 2307/41; B32B 2457/20; G06F 1/1637; G06F 1/1641; G06F 1/1652; G06F 1/1656; G06F 1/1616; G06F 1/1628; G06F 2200/1635; G09F 9/301; C09J 9/00; C08L 23/142; C08L 2203/30; C08L 2205/025; C08L 2205/03; C08L 2207/02; C08L 2314/02; C08L 23/14; C08L 23/0815; C08L 23/16; C08L 2314/06; B29B 7/90; B29B 9/065; B29C 45/0001; C08J 3/005; C08J 2323/14; C08J 2423/08; C08J 2423/14; B29K 2023/12; B29K 2105/16; B29K 2509/02; B29L 2031/30; B29L 2031/712; C08F 210/16; C08F 210/06; C08F 4/65908; C08F 4/65912; C08F 4/65916; C08K 3/013; C08K 3/26; C08K 3/34; C08K 2003/265; C08K 2201/005

See application file for complete search history.

(56) References Cited

FOREIGN PATENT DOCUMENTS

| WO | 2016070416 A1 | 5/2016 | |
|---|---|---|---|
| WO | WO-2016162359 A1 * | 10/2016 | ............ C08L 23/142 |
| WO | 2019002294 A1 | 1/2019 | |

* cited by examiner

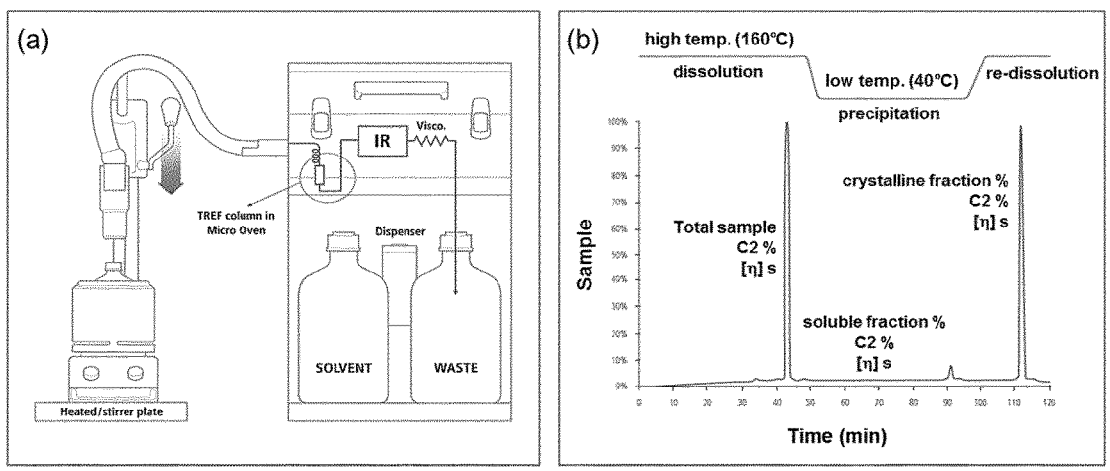

POLYPROPYLENE COMPOSITION WITH IMPROVED PROCESSABILITY AND IMPACT STRENGTH

The present invention relates to heterophasic polypropylene compositions comprising a propylene homo- or copolymer forming a crystalline fraction as a matrix and an amorphous propylene ethylene elastomer as a soluble fraction dispersed in said matrix. The heterophasic polypropylene compositions further comprise an elastomeric ethylene/alpha-olefin random copolymer. The heterophasic polypropylene compositions have a well-balanced relation between stiffness and impact strength, low volatile and semi-volatile emissions and good processability.

BACKGROUND INFORMATION

Compositions based on propylene copolymers are widely used in several areas of the polymer industry ranging from advanced packaging solutions to technical uses, like in the automotive or electronic area. These compositions, comprising crystalline as well as elastomeric components, are characterized by a balanced combination of stiffness and impact strength, but are frequently limited in processability. The trend towards reduced wall thickness to save both energy and component weight requires lower viscosities, respectively increased melt flow rates (MFRs). A problem is, however, that normally impact strength is significantly reduced if MFR at a given level of stiffness or elastomer content, respectively, is increased. Furthermore, both in food packaging and in the automotive area, the emission of volatile and semi-volatile hydrocarbon components (i.e. VOC and FOG levels as determined in accordance with VDA 278) should be as low as possible. Also here, existing compositions exhibit higher levels of emissions when increasing MFR. Consequently, there is a need for developing compositions combining a well-balanced relation between stiffness and impact strength, low volatile and semi-volatile emissions and good processability, i.e. higher melt flow rate (MFR).

DESCRIPTION OF THE PRIOR ART

In EP 2275485 A1, heterophasic polypropylene compositions comprising (A) 45 to 70 wt.-% of a propylene homo- or copolymer matrix with an $MFR_2$ (determined in accordance with ISO 1133 at 230° C. and 2.16 kg load) of at least 80 g/10 min, (B) 25 to 40 wt.-% of an elastomeric propylene-ethylene copolymer, having an intrinsic viscosity IV (ISO 1628, with decalin as solvent) of 3.3 dl/g and an ethylene content of 20 to 50 wt.-%, (C) 0-15 wt.-% of an elastomeric ethylene/alpha-olefin random copolymer and (D) 3-25 parts per weight of inorganic filler are described. The respective heterophasic polypropylene compositions have a total $MFR_2$ of at least 5 g/10 min, a Charpy notched impact strength according to ISO 179/1eA at +23° C. of at least 15.0 $kJ/m^2$, a Charpy notched impact strength according to ISO 179/1eA at −20° C. of at least 7.0 $kJ/m^2$ and a tensile modulus according to ISO 527-3 of at least 1200 MPa. Neither VOC nor FOG levels are indicated for the inventive compositions, which moreover exhibit limited impact performance at higher $MFR_2$ and high stiffness only in combination with fillers.

In EP 2426171 A1, heterophasic polypropylene resins having an $MFR_2$ (determined according to ISO 1133 at 230° C. and a load of 2.16 kg) of 25 to below 100 g/10 min comprising a crystalline polypropylene homopolymer matrix (A) and an amorphous propylene/ethylene or propylene/alpha olefin copolymer phase (B) dispersed within the matrix are disclosed. Said heterophasic polypropylene resins have (i) 35 to 75 wt.-% of a fraction insoluble in p-xylene at 25° C. (XCU) with an intrinsic viscosity of less than 1.1 dl/g, determined according to DIN EN ISO 1628-1 and -3, and a melting point of more than 150° C., and (ii) 25 to 65 wt.-% of a fraction soluble in p-xylene at 25° C. (XCS) with an intrinsic viscosity of 2.0 to 5.0 dl/g as well as a content of ethylene and/or alpha olefin in the range of 40 to 70 wt.-%, based on the total weight of the XCS fraction, and the absence of a melting point, in a DSC analysis in the range between 0 and 300° C. Neither VOC nor FOG levels are indicated for the inventive compositions, which also have a limited stiffness.

In EP 2681277 A1, polyolefin compositions comprising (a) 35-90 wt.-%, based on the weight of the heterophasic polypropylene composition, of a heterophasic polypropylene composition comprising (i) 10-50 wt.-%, based on the weight of the heterophasic polypropylene composition, of a first propylene homopolymer (PPH1) having an $MFR_2$ (measured according to ISO 1133 at 230° C. and a load of 2.16 kg) of from 30-80 g/10 min, (ii) 20-65 wt.-%, based on the weight of the heterophasic polypropylene composition, of a second propylene homopolymer (PPH2) having an $MFR_2$ of from 100-250 g/10 min, (iii) 5-30 wt.-%, based on the weight of the heterophasic polypropylene composition of a first xylene cold soluble fraction (XS1) having an intrinsic viscosity IVXS1 of 2.0-3.0 dl/g, (iv) 5-25 wt.-%, based on the weight of the heterophasic polypropylene composition of a second xylene cold soluble (XS2) fraction having an intrinsic viscosity IVXS2 of 1.5-2.8 dl/g, with the proviso that IVXS1≠IVXS2, (b) 5-40 wt.-%, based on the weight of the polyolefin composition, of an inorganic filler, and (c) 5-25 wt.-%, based on the weight of the polyolefin composition, of an ethylene/1-butene elastomer. Neither VOC nor FOG levels are indicated for the inventive compositions, which only show high stiffness in combination with significant amounts of fillers. Finally, in WO 2019042875 A1, a polypropylene composition having a melt flow rate $MFR_2$ (determined according to ISO 1133 at 230° C. and a load of 2.16 kg) in the range of 5 to 50 g/10 min, the polypropylene composition comprising (a) 55 to 75 wt.-%, based on the total weight of the polypropylene composition, of a crystalline fraction (CF) as determined in the CRYSTEX QC method, the crystalline fraction (CF) having (i) a melting temperature (Tm) measured by differential scanning calorimetry (DSC) between 147° C. and 162° C., and (ii) an ethylene content of <1 wt.-%, based on the total weight of the crystalline fraction (CF); and (b) 25 to 45 wt.-%, based on the total weight of the polypropylene composition, of a soluble fraction (SF) as determined in the CRYSTEX QC method, the soluble fraction (SF) having (i) an intrinsic viscosity (IV) in the range of 1.0 to 2.0 dl/g, and (ii) an ethylene content in the range of 18 to 40 wt.-%, based on the total weight of the soluble fraction (SF). Said polypropylene composition has a ratio of intrinsic viscosity of the soluble fraction (IV(SF)) to intrinsic viscosity of the crystalline fraction (IV(CF)) [(IV(SF))/(IV(CF))] in the range from 0.7 to <1.2. Neither VOC nor FOG levels are indicated for the inventive compositions, which also have a limited stiffness.

OBJECT OF THE INVENTION

The target of the present invention are polypropylene compositions combining a well-balanced relation between stiffness and impact strength, low volatile and semi-volatile emissions and good processability, i.e. higher melt flow rate (MFR).

It was surprisingly found that such polypropylene compositions can be achieved by combining 60 to 95 wt.-% of a first heterophasic propylene copolymer (A) comprising 78.0 to 92.0 wt.-% of a crystalline matrix (A1) being a propylene homo- or copolymer, said crystalline matrix corresponding to the crystalline fraction (CF) determined according to CRYSTEX QC method, ISO 6427-B and containing 0.0 to 2.0 wt.-% comonomer and 8.0 to 22.0 wt.-% of an amorphous propylene-ethylene elastomer (A2), optionally comprising C4-C8 alpha-olefin(s) as further comonomers, dispersed in said crystalline matrix (A1), wherein (A1) and (A2) add up to 100 wt.-%, and wherein said amorphous propylene ethylene elastomer (A2) corresponds to the soluble fraction (SF) determined according to CRYSTEX QC method, ISO 6427-B and contains 15.0 to 30.0 wt.-% of comonomer, said heterophasic propylene copolymer being characterised by a melt flow rate $MFR_2$, determined according to ISO1133 at 230° C. and a load of 2.16 kg, of 30 to 120 g/10 min, with 5 to 40 wt.-% of an elastomeric ethylene/alpha-olefin random copolymer (B) characterized by an $MFR_2$, determined according to ISO1133 at 190° C. and a load of 2.16 kg, of 0.1 to 100 g/10 min and a density in the range of 840 to below 900 kg/m³, wherein (A) and (B) add up to 100 wt.-%.

Optionally, said polypropylene compositions may further comprise 5.0 to 15.0 wt.-% of a second heterophasic propylene copolymer (C) characterised by a melt flow rate $MFR_2$, determined according to ISO1133 at 230° C. and a load of 2.16 kg, of 5 to 25 g/10 min and comprising a fraction soluble in cold xylene (XCS) in the range of 25.0 to 50.0 wt.-%. Further optionally, said polypropylene compositions may comprise 5.0 to 30.0 wt.-% of a reinforcing mineral filler (D). Preferably, the respective polypropylene compositions are characterised by a melt flow rate $MFR_2$, determined according to ISO1133 at 230° C. and a load of 2.16 kg, of 10.0 to 100 g/10 min and comprise a fraction soluble in cold xylene (XCS) in the range of 20.0 to 50.0 wt.-%, said fraction having a content of comonomers selected from ethylene and/or C4-C8 alpha-olefin(s) in the range of 20.0 to 40.0 wt.-%. More preferably, the respective polypropylene compositions are characterized by less than 100 µg/g of volatiles (VOC, VDA 278 October 2011) and less than 200 µg/g of semi-volatile organic condensables (FOG, VDA 278 October 2011).

The invention further relates to a process for producing such polypropylene compositions by
(i) polymerizing the first heterophasic propylene copolymer (A) in a sequential polymerization process in the presence of a single-site catalyst system, and
(ii) melt-mixing said copolymer (A) with a suitable amount of an elastomeric ethylene/alpha-olefin random copolymer (B),
(iii) optionally adding a suitable amount of the second heterophasic propylene copolymer (C) polymerized in the presence of a Ziegler-Natta type catalyst system and/or a suitable amount of a reinforcing mineral filler (D) in said melt-mixing step, followed by
(iv) solidifying the resulting melt in a strand pelletization or underwater pelletization step.

Moreover, the invention relates to injection molded articles comprising said polypropylene compositions being characterized by a flexural modulus as determined in accordance with ISO 178 in the range of 500 to 1000 MPa, a Charpy notched impact strength (NIS), determined in accordance with ISO 179/1eA at 23° C., of more than 20.0 kJ/m² and a Charpy NIS, determined in accordance with ISO 179/1eA at −20° C., of more than 6.0 kJ/m². It also relates to packaging articles or automotive components having a wall thickness of at most 1.5 mm and comprising said polypropylene compositions.

In the following, the components of said polypropylene compositions as well as the compositions are described in more detail.

The First Heterophasic Propylene Copolymer (A)

The first heterophasic propylene copolymer (A) is present in the polypropylene composition according to the invention in an amount of 60 to 95 wt.-%, preferably in an amount of 65 to 92 wt. %, more preferably in an amount of 70 to 90 wt.-%.

Said first heterophasic propylene copolymer (A) comprises 78.0 to 92.0 wt.-%, preferably 79.0 to 91.0 wt.-%, more preferably 80.0 to 90.0 wt.-% of a crystalline matrix (A1) being a propylene homo- or copolymer, said crystalline matrix corresponding to the crystalline fraction (CF) determined according to CRYSTEX QC method, ISO 6427-B and containing 0.0 to 2.0 wt.-%, preferably 0.5 to 1.8 wt.-%, more preferably 0.7 to 1.6 wt.-% of comonomer. Said comonomer is preferably ethylene. The crystalline fraction (CF) preferably has an Intrinsic Viscosity (IV) determined according to ISO1628 of 0.6 to 2.0 dl/g, more preferably of 0.8 to 1.8 dl/g, most preferably of 0.9 to 1.6 dl/g.

The first heterophasic propylene copolymer (A) further comprises 8.0 to 22.0 wt.-%, preferably 9.0 to 21.0 wt.-%, more preferably 10.0 to 20.0 wt.-% of an amorphous propylene-ethylene elastomer (A2), optionally comprising C4-C12 alpha-olefin(s) as further comonomers, dispersed in said crystalline matrix (A1), wherein said amorphous propylene ethylene elastomer (A2) corresponds to the soluble fraction (SF) determined according to CRYSTEX QC method, ISO 6427-B and contains 15.0 to 30.0 wt.-%, preferably 16.5 to 28.0 wt.-%, more preferably 17.5 to 26.0 wt.-% of comonomer. Said comonomer is ethylene and/or one or more C4-C8 alpha-olefin(s). Preferably, said comonomer is ethylene. The soluble fraction (SF) preferably has an Intrinsic Viscosity (IV) determined according to ISO1628 of 1.8 to 3.5 dl/g, more preferably of 2.0 to 3.2 dl/g, most preferably of 2.1 to 3.1 dl/g.

The relative amounts of the crystalline matrix (A1) and the amorphous propylene-ethylene elastomer (A2) add up to 100 wt.-%.

According to a preferred embodiment, the first heterophasic propylene copolymer (A) has a melt flow rate $MFR_2$, determined according to ISO1133 at 230° C. and a load of 2.16 kg, of 20 to 120 g/10 min, preferably of 35 to 110 g/10 min, more preferably of 38 to 100 g/10 min. According to yet another preferred embodiment, the first heterophasic propylene copolymer (A) has a hexane-soluble fraction according to FDA method (C6FDA) in the range of 0.8 to 2.8 wt.-%, preferably in the range of 1.0 to 2.3 wt.-%, more preferably in the range of 1.1 to 2.0 wt.-%.

The heterophasic polypropylene composition may have a fraction soluble in cold xylene (XCS) in the range of 8.0 to 22.0 wt.-%, preferably in the range of 9.0 to 21.0 wt.-%, more preferably in the range of 10.0 to 20.0 wt.-%. The comonomer content of said fraction soluble in cold xylene (XCS) of the heterophasic polypropylene composition may be in the range of 15.0 to 30.0 wt.-%, preferably in the range of more than 16.5 to 28.0 wt.-%, more preferably in the range of 17.5 to 26.0 wt.-%. The intrinsic viscosity IV(XCS) of said fraction soluble in cold xylene (XCS) of the heterophasic polypropylene composition may be in the range of 1.8 to 3.5 dl/g, preferably in the range of 2.0 to 3.2 dl/g, more preferably in the range of 2.1 to 3.1 dl/g.

The melting temperature, Tm(DSC), of the inventive polymer may be in the range of 145 to 162° C., preferably in the range of 150 to 160° C., more preferably in the range of 152 to 158° C. The crystallisation temperature Tc(DSC) of the inventive polymer may be in the range of 103 to 123° C., preferably in the range of 108 to 120° C., more preferably in the range of 110 to 118° C.

The crystalline matrix (A1) of the first heterophasic propylene copolymer (A) is a propylene homo- or copolymer, like a propylene random copolymer. It may contain alpha-olefins selected from ethylene and C4 to C8 alpha olefins, preferably from ethylene or 1-butene. In a preferred embodiment the crystalline matrix comprises ethylene as comonomer. In an equally preferred embodiment, the crystalline matrix is a propylene homopolymer. The crystalline matrix may accordingly comprise comonomer, as outlined above, in an amount of 0.0 to 2.0 wt.-%, preferably in an amount of 0.3 to 1.8 wt.-%, more preferably in an amount of 0.5 to 1.6 wt.-%.

The crystalline matrix forms 78.0 to 95.0 wt.-%, preferably 80.0 to 93.0 wt.-%, more preferably 81.0 to 92.0 wt.-% of the first heterophasic propylene copolymer (A).

The melt flow rate $MFR_2$, determined according to ISO1133 at 230° C. and a load of 2.16 kg, of the crystalline matrix (A1) may be in the range of 80 to 200 g/10 min, preferably in the range of 90 to 180 g/10 min, more preferably in the range of 95 to 170 g/10 min.

The amorphous propylene ethylene elastomer (A2), being present as dispersed particles in the crystalline matrix (A1) of the first heterophasic propylene copolymer (A), forms 5.0 to 22.0 wt.-%, preferably 7.0 to 20.0 wt.-%, more preferably 8.0 to 19.0 wt.-% of said heterophasic propylene copolymer.

The amorphous propylene ethylene elastomer (A2) is predominantly characterized via the soluble fraction of CRYSTEX QC method IS06427-B and may be in the range of 8.0 to 22.0 wt.-%, preferably in the range of 9.0 to 21.0 wt.-%, more preferably in the range of 10.0 to 20.0 wt.-%. The amorphous propylene ethylene elastomer (A2) may also comprise alpha-olefins selected from C4 to C8 alpha olefins, preferably from 1-butene or 1-hexene. In a preferred embodiment, the amorphous propylene ethylene elastomer (A2) comprises ethylene and 1-butene as comonomers. In an especially preferred embodiment, the amorphous propylene ethylene elastomer (A2) comprises, more preferably consists of propylene and ethylene as the sole comonomers.

According to a preferred embodiment, the first heterophasic propylene copolymer (A) is produced in a sequential polymerization process in the presence of a single-site catalyst system. Preferably, said catalyst system comprises an asymmetric metallocene catalyst complex and one or more cocatalysts.

The Elastomeric Ethylene/Alpha-Olefin Random Copolymer (B)

The elastomeric ethylene/alpha-olefin random copolymer (B) is present in the polypropylene composition according to the invention in amount of 5 to 40 wt.-%, preferably in an amount of 8 to 35 wt.-%, more preferably in an amount of 10 to 30 wt.-%.

Preferred elastomeric ethylene/alpha-olefin random copolymers (B) are elastomeric copolymers of ethylene and C4 to C8 alpha-olefins, like ethylene-1-butene copolymers, ethylene-1-hexene copolymers or ethylene-1-octene copolymers. More preferred ethylene/alpha-olefin random copolymers are ethylene-1-butene copolymers and ethylene-1-octene copolymers. Most preferably, ethylene-1-octene copolymers are used.

The elastomeric ethylene/alpha-olefin random copolymer (B) has an $MFR_2$, determined according to ISO1133 at 190° C. and a load of 2.16 kg, of 0.1 to 100 g/10 min, preferably of 0.2 to 50 g/10 min, more preferably of 0.5 to 20 g/10 min, and a density in the range of 840 to below 900 $kg/m^3$, preferably in the range of 850 to below 890 $kg/m^3$, more preferably in the range of 852 to below 880 $kg/m^3$.

According to a preferred embodiment, the elastomeric ethylene/alpha-olefin random copolymer (B) is an ethylene-1-octene copolymer having an octene content of at least 20 wt.-%, preferably of about 25-50 wt.-%, more preferably of about 30-45 wt.-%, and a density of less than 880 $kg/m^3$, preferably less than 870 $kg/m^3$.

According to another preferred embodiment, the elastomeric ethylene/alpha-olefin random copolymer (B) is characterized by one or more glass transition temperatures as determined by differential scanning calorimetry (DSC) or dynamic-mechanical thermal analysis (DMTA) in the range of −90 to −35° C., preferably in the range of −85 to −40° C., more preferably in the range of −80 to −45° C.

According to yet another preferred embodiment, the elastomeric ethylene/alpha-olefin random copolymer (B) is characterized by a melting temperature as determined by differential scanning calorimetry (DSC) in the range of 20 to 65° C., preferably in the range of 25 to 60° C., more preferably in the range of 30 to 55° C.

Preferably, the elastomeric ethylene/alpha-olefin random copolymer (B) is based on a solution polymerization process using a single-site catalyst. The production of elastomeric ethylene-1-octene copolymers is described in detail in: Chum S P, Kao C I and Knight G W: Structure, properties and preparation of polyolefins produced by single-site technology. In: Metallocene based Polyolefins—Volume 1, Scheirs J and Kaminsky W Eds, John Wiley and Sons Ltd, Chichester (West Sussex, England), 2000 pp. 262-264. Alternatively, elastomeric ethylene-1-octene copolymers, which are commercially available can be used. Suitable grades are for example offered in the Engage grade series by DOW Chemical, USA, in the Queo grade series by Borealis AG, Austria and in the Exact grade series by ExxonMobil, USA.

The Second Heterophasic Propylene Copolymer (C)

If present, the amount of the second heterophasic propylene copolymer (C) in the heterophasic polypropylene composition according to the invention may be in the range of 5.0 to 15.0 wt.-%, preferably in the range of 7.0 to 13.0 wt.-%, more preferably in the range of 8.0 to 12.0 wt.-%, based on the total weight of the heterophasic polypropylene composition.

The second heterophasic propylene copolymer (C) contains comonomers, preferably alpha-olefins selected from ethylene and C4 to C8 alpha olefins, preferably from ethylene, 1-butene or 1-hexene. In a preferred embodiment, the second heterophasic propylene copolymer comprises ethylene and 1-butene as comonomer. In an especially preferred embodiment, the second heterophasic propylene copolymer comprises, only ethylene as the sole comonomer.

The melt flow rate $MFR_2$, determined according to ISO1133 at 230° C. and a load of 2.16 kg, of the second heterophasic propylene copolymer (C) may be in the range of 5.0 to 25.0 g/10 min, preferably in the range of 7.0 to 20.0 g/10 min, more preferably in the range of 8.0 to 15.0 g/10 min.

The second heterophasic propylene copolymer has a fraction soluble in cold xylene (XCS) in the range of 25.0 to 50.0 wt.-%, preferably in the range of 28.0 to 45.0 wt.-%, more preferably in the range of 30.0 to 40.0 wt.-%.

The comonomer content of the fraction soluble in cold xylene, C2(XCS), of the second heterophasic propylene copolymer may be in the range of 20.0 to 60.0 wt.-%, preferably in the range of 26.0 to 55.0 wt.-%, more preferably in the range of 30.0 to 50.0 wt.-%.

The Intrinsic Viscosity of the fraction soluble in cold xylene, IV(XCS), may be in the range of 1.0 to 10.0 dl/g, preferably in the range of 1.2 to 9.0 dl/g, more preferably in the range of 1.4 to 8.0 dl/g.

According to a preferred embodiment, the second heterophasic propylene copolymer (C) is produced in a sequential polymerization process in the presence of a Ziegler-Natta type catalyst system. Preferably, said catalyst system comprises a self-supported Ziegler-Natta catalyst comprising a Magnesium compound, a Titanium compound and a non-phthalic internal electron donor (ID), a co-catalyst being an aluminium compound and an external donor (ED) being a silane.

The Reinforcing Mineral Filler (D)

If present, the amount of the reinforcing mineral filler (D) in the heterophasic polypropylene composition according to the invention may be in the range of 5.0 to 30.0 wt.-%, preferably in the range of 7.0 to 25.0 wt.-%, more preferably in the range of 8.0 to 20.0 wt.-%.

According to a preferred embodiment of the present invention, the reinforcing mineral filler (D) is selected from the group consisting of talc, mica, wollastonite and calcium carbonate. More preferably, the reinforcing mineral filler (D) is talc.

According to another preferred embodiment of the present invention, the reinforcing mineral filler (D) used for the polypropylene composition according to the invention has a median particle size (D50) of 0.5-15 µm and a top cut (D95) of 1-50 µm. More preferably, the reinforcing mineral filler (D) has a median particle size (D50) of 0.8–12 µm and a top cut (D95) of 1.0-30 µm, most preferably a median particle size (D50) of 1.5-10 µm and a top cut (D95) of 2.0-20 µm.

A usual method for measuring particle size distribution is a laser diffraction method, from which the median particle size (D50) and the top cut (D95) can be calculated. An alternative way for defining top cut is to specify the fraction of filler particles having a diameter above a certain limit, i.e. the so-called screen residue.

The Inventive Polypropylene Composition

The respective polypropylene composition, comprising the first heterophasic propylene copolymer (A), the elastomeric ethylene/alpha-olefin random copolymer (B) and optionally the second of heterophasic propylene copolymer (C) and/or the reinforcing mineral filler (D) as defined above, can also be characterized by summary properties.

Preferably, the respective polypropylene composition is characterised by a melt flow rate $MFR_2$, determined according to ISO1133 at 230° C. and a load of 2.16 kg, of 10.0 to 100 g/10 min, more preferably of 13.0 to 75 g/10 min, most preferably of 15.0 to 50 g/10 min. It is equally preferable that the respective polypropylene composition comprises a fraction soluble in cold xylene (XCS) in the range of 20.0 to 50.0 wt.-%, more preferably in the range of 24.0 to 45.0 wt.-%, most preferably in the range of 26.0 to 42.0 wt.-%. Said fraction soluble in cold xylene (XCS) may have a content of comonomers selected from ethylene and/or C4-C8 alpha-olefin(s) in the range of 20.0 to 40.0 wt.-%, preferably in the range of 22.0 to 38.0 wt.-%, more preferably in the range of 24.0 to 36.0 wt.-%.

According to a specifically preferred embodiment, the respective polypropylene composition is characterized by less than 100 µg/g, preferably less than 80 µg/g, more preferably less than 60 µg/g of volatiles (VOC, VDA 278 October 2011) and less than 200 µg/g, preferably less than 175 µg/g, more preferably less than 150 µg/g of semi-volatile organic condensables (FOG, VDA 278 October 2011). The VOC and FOG content is typically determined on pellets immediately after production without any specific measures for reducing emissions like aeration.

The polypropylene composition according to the invention may further comprise conventional additives in an amount of up to 5.0 wt.-%, preferably in an amount of up to 2.0 wt.-%, more preferably in an amount of up to 1.0 wt.-%. Examples of additives include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers such as nucleating agents (for example sodium benzoate or sodium-2,2'-methylene-bis(4, 6-di-t-butylphenyl)phosphate), antistatic or antifogging agents (for example ethoxylated amines and amides or glycerol esters), acid scavengers (for example Ca-stearate) and blowing agents for foaming. Further modifiers are lubricants and resins (for example ionomer waxes, polyethylene- and ethylene copolymer waxes, Fischer Tropsch waxes, montan-based waxes, fluoro-based compounds, or paraffin waxes), as well as slip and antiblocking agents (for example erucamide, oleamide, talc, natural silica and synthetic silica or zeolites) and mixtures thereof.

The Production Process

The process for producing a polypropylene composition according to the invention comprises the following process steps:
  (i) polymerizing the first heterophasic propylene copolymer (A) in a sequential polymerization process, preferably in the presence of a single-site catalyst system, and
  (ii) melt-mixing said copolymer (A) with a suitable amount of an elastomeric ethylene/alpha-olefin random copolymer (B),
  (iii) optionally adding a suitable amount of the second heterophasic propylene copolymer (C) polymerized in the presence of a Ziegler-Natta type catalyst system as well as a suitable amount of a reinforcing mineral filler (D) in said melt-mixing step, followed by
  (iv) solidifying the resulting melt in a strand pelletization or underwater pelletization step.

Step (i) of said process for producing a polypropylene composition according to the invention is a process for polymerising the first heterophasic propylene copolymer (A). This is preferably achieved by sequential polymerisation in the presence of a single-site catalyst system, wherein
  a first polypropylene fraction being a propylene homopolymer or a propylene-ethylene random copolymer having a comonomer content of 0.0 to 1.0 wt.-% is prepared in a bulk phase reactor in a first polymerisation stage in a loop reactor,
  optionally transferring said first polypropylene fraction into second polymerisation stage in which a second polypropylene fraction being a propylene homopolymer or a propylene-ethylene random copolymer having a comonomer content of 0.0 to 1.0 wt.-% is prepared in a gas phase reactor (GPR1), recovering from said bulk phase reactor or optionally from said GPR1 the crystalline matrix (A1) of the first heterophasic propylene copolymer (A), transferring the crystalline matrix (A1) to a second (optionally third) polymerisation stage, in which the amorphous propylene ethylene elastomer (A2) having a comonomer content (C2 of SF) of 15.0 to 30.0 wt.-%, like 16.5 to 28.0 wt.-%, or 17.5 to 26.0 wt.-%. is prepared in a gas phase reactor (GPR2), the mixture of said two, optionally three polymers, optionally being subjected to a deactivation and purification step followed by compounding and pelletization.

The first heterophasic propylene copolymer (A) is typically and preferably produced in a multistage polymerization process well known in the art. A preferred multistage process is a loop-gas phase-process, such as developed by Borealis A/S, Denmark (known as BORSTAR® technology) described e.g. in patent literature, such as in EP-A-0887379 or in WO 92/12182.

The invention preferably relates to the copolymerisation of propylene, ethylene and optionally further comonomers as defined above and below, in an at least two, optionally three step process so as to form the heterophasic polypropylene composition. Preferably, propylene and ethylene are the only monomers used.

Ideally, the process of the invention employs two, preferably three main reactors, a first reactor operating in bulk, an optional first gas phase reactor and a second gas phase reactor.

The process may also utilize a prepolymerisation step, taking place in a separate reactor before the two (three) main reactors.

The first heterophasic propylene copolymer (A) is preferably obtained by a single-site catalyst system, more preferably by a single-site catalyst system comprising an asymmetric metallocene catalyst complex and cocatalysts.

Single-Site Catalyst System

Preferred complexes of the metallocene catalyst include:
rac-dimethylsilanediylbis[2-methyl-4-(3',5'-dimethylphenyl)-5-methoxy-6-tert-butylinden-1-yl]zirconium dichloride,
rac-anti-dimethylsilanediyl[2-methyl-4-(4'-tert-butylphenyl)-inden-1-yl][2-methyl-4-(4'-tert-butylphenyl)-5-methoxy-6-tert-butylinden-1-yl]zirconium dichloride,
rac-anti-dimethylsilanediyl[2-methyl-4-(4'-tert-butylphenyl)-inden-1-yl][2-methyl-4-phenyl-5-methoxy-6-tert-butylinden-1-yl]zirconium dichloride,
rac-anti-dimethylsilanediyl[2-methyl-4-(3',5'-tert-butylphenyl)-1,5,6,7-tetrahydro-s-indacen-1-yl][2-methyl-4-(3',5'-dimethyl-phenyl)-5-methoxy-6-tert-butylinden-1-yl]zirconium dichloride,
rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl]zirconium dichloride,
rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tert-butylinden-1-yl]zirconium dichloride,
rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl]zirconium dichloride.

Especially preferred is rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tert-butylinden-1-yl]zirconium dichloride.

Cocatalyst

To form an active catalytic species it is normally necessary to employ a cocatalyst as is well known in the art.

According to the present invention a cocatalyst system comprising a boron containing cocatalyst and an aluminoxane cocatalyst is used in combination with the above defined metallocene catalyst complex.

The aluminoxane cocatalyst can be one of formula (II):

(II)

where n is from 6 to 20 and R has the meaning below.

Aluminoxanes are formed on partial hydrolysis of organoaluminum compounds, for example those of the formula AlR3, AlR2Y and Al2R3Y3 where R can be, for example, C1-C10-alkyl, preferably C1-C5-alkyl, or C3-C10-cycloalkyl, C7-C12-arylalkyl or -alkylaryl and/or phenyl or naphthyl, and where Y can be hydrogen, halogen, preferably chlorine or bromine, or C1-C10-alkoxy, preferably methoxy or ethoxy. The resulting oxygen-containing aluminoxanes are not in general pure compounds but mixtures of oligomers of the formula (II).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

Also a boron containing cocatalyst may be used in combination with the aluminoxane cocatalyst.

The catalyst complex ideally comprises a co-catalyst, certain boron containing cocatalysts are preferred. Especially preferred borates of use in the invention therefore comprise the trityl, i.e. triphenylcarbenium, ion. Thus the use of Ph3CB(PhF5)4 and analogues therefore are especially favoured.

The catalyst system of the invention is used in supported form. The particulate support material used is silica or a mixed oxide such as silica-alumina, in particular silica.

The use of a silica support is preferred. The skilled man is aware of the procedures required to support a metallocene catalyst.

In a preferred embodiment, the catalyst system corresponds to the ICS3 as disclosed in EP19177308.4.

Step (ii) of said process for producing a polypropylene composition according to the invention is a melt-mixing process for combining the first heterophasic propylene copolymer (A) with the elastomeric ethylene/alpha-olefin random copolymer (B). The melt-mixing process may be performed in any suitable melt-mixing device. Devices suited for this process step (ii) are discontinuous and continuous kneaders, twin-screw extruders and single screw extruders with special mixing sections, Farell kneaders and co-kneaders like Buss co-kneaders. The temperature, rotation speed, throughput and residence time must be chosen in such a way that a sufficiently high degree of homogenization is achieved.

Typically, co-rotating and intermeshing twin-screw extruders with special mixing sections are applied for this process step (ii). Typical melt-mixing temperatures are in the range of 200 to 280° C. The extruder typically comprises a feed zone, a melting zone, a mixing zone and optionally a die zone, it typically has a length over diameter ratio, L/D, of up to 60:1, preferably of up to 40:1.

Furthermore, additives like stabilizers or nucleating agents may be added during the melt-mixing step.

Optionally, according to (iii) a suitable amount of the second heterophasic propylene copolymer (C) polymerized in the presence of a Ziegler-Natta type catalyst system as well as a suitable amount of a reinforcing mineral filler (D) can be added in said melt-mixing step.

Ziegler-Natta Catalyst System

For the production of the second heterophasic propylene copolymer (C), the same processes as described for the first heterophasic propylene copolymer (A) may be employed. The Ziegler-Natta type catalyst system used for polymerizing the second heterophasic propylene copolymer (C) preferably comprises a self-supported Ziegler-Natta catalyst comprising a Magnesium compound, a Titanium compound and a non-phthalic internal electron donor (ID), a co-catalyst being an aluminium compound and an external donor (ED) being a silane.

Generally, the polymerization Ziegler-Natta catalyst comprises one or more compounds of a transition metal (TM) of Group 4 to 6 as defined in IUPAC version 2013, like titanium, further a Group 2 metal compound, like a magnesium compound and an internal donor (ID).

It is further preferred that the catalyst components are not supported on an external support, but the catalyst is prepared by an emulsion-solidification method or by a precipitation method, as is well-known by the man skilled in the art of catalyst preparation.

More preferably, a specific type of Ziegler-Natta catalyst is present in the process according to the invention. In this specific type of Ziegler-Natta catalyst, it is essential that the internal donor is a non-phthalic compound. Preferably, through the whole specific type of Ziegler-Natta catalyst preparation no phthalate compound is used, thus the final specific type of Ziegler-Natta catalyst does not contain any phthalic compound. Thus, the specific type of Ziegler-Natta catalyst is free of phthalic compounds. Therefore, the polymer obtained by the process according to the invention is free of phthalic compounds.

Generally, the specific type of Ziegler-Natta catalyst comprises an internal donor (ID) which is chosen to be a non-phthalic compound, in this way the specific type of Ziegler-Natta catalyst is completely free of phthalic compound. Further, the specific type of Ziegler-Natta catalyst can be a solid catalyst preferably being free of any external support material, like silica or $MgCl_2$, and thus the solid catalyst is self-supported.

The solid catalyst is obtainable by the following general procedure:
 a) providing a solution of
  a1) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or
  a2) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or
  a3) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
  a4) Group 2 metal alkoxy compound of formula $M(OR1)_n(OR2)_mX_{2-n-m}$ or mixture of Group 2 alkoxides $M(OR1)_nX_{2-n'}$ and $M(OR2)_mX_{2-m'}$, where M is a Group 2 metal, X is halogen, R1 and R2 are different alkyl groups of 2 to 16 carbon atoms, and 0<n<2, 0<m<2 and n+m+(2−n−m)=2, provided that n and m are not 0 simultaneously, 0<n'<2 and 0<m'<2; and
 b) adding said solution from step a) to at least one compound of a transition metal of Group 4 to 6, and
 c) obtaining the solid catalyst component particles, and adding a non-phthalic internal electron donor (ID) at least in one step prior to step c).

The internal donor (ID) or precursor thereof is preferably added to the solution of step a) or to the transition metal compound before adding the solution of step a). According to the procedure above, the solid catalyst can be obtained via a precipitation method or via an emulsion—solidification method depending on the physical conditions, especially the temperature used in steps b) and c). An emulsion is also called liquid-liquid two-phase system. In both methods (precipitation or emulsion-solidification) the catalyst chemistry is the same. In the precipitation method, combination of the solution of step a) with at least one transition metal compound in step b) is carried out and the whole reaction mixture is kept at least at 50° C., more preferably in a temperature range of 55 to 110° C., more preferably in a range of 70 to 100° C., to secure full precipitation of the catalyst component in the form of solid catalyst component particles (step c).

In the emulsion-solidification method, in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by the emulsion-solidification method is preferably used in the present invention. In step a) preferably the solution of a2) or a3) is used, i.e. a solution of (Ax') or a solution of a mixture of (Ax) and (Bx).

Preferably, the Group 2 metal is magnesium. The magnesium alkoxy compounds (Ax), (Ax'), (Bx) can be prepared in situ in the first step of the catalyst preparation process, step a), by reacting the magnesium compound with the alcohol(s) as described above. Another option is to prepare said magnesium alkoxy compounds separately or they can be even commercially available as already prepared magnesium alkoxy compounds and used as such in the catalyst preparation process of the invention.

Illustrative examples of alcohols (A) are glycol monoethers. Preferred alcohols (A) are C2 to C4 glycol monoethers, wherein the ether moieties comprise from 2 to 18 carbon atoms, preferably from 4 to 12 carbon atoms. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

The illustrative monohydric alcohol (B) is represented by the structural formula ROH with R being a straight-chain or branched C2-C16 alkyl residue, preferably a C4 to C10 alkyl residue, more preferably a C6 to C8 alkyl residue. The most preferred monohydric alcohol is 2-ethyl-1-hexanol or octanol.

Preferably, a mixture of Mg alkoxy compounds (Ax) and (Bx) or a mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

The magnesium alkoxy compound may be a reaction product of alcohol(s), as defined above and a magnesium compound selected from dialkyl magnesium, alkyl magnesium alkoxide, magnesium dialkoxide, alkoxy magnesium halide and alkyl magnesium halide. Further, magnesium dialkoxide, magnesium diaryloxide, magnesium aryloxyhalide, magnesium aryloxide and magnesium alkyl aryloxide can be used. Alkyl groups in the magnesium compound can be similar or different C1-C20 alkyl groups, preferably C2-C10 alkyl groups. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred, dialkyl magnesiums are butyl octyl magnesium or butyl ethyl magnesium.

It is also possible that the magnesium compound reacts in addition to the alcohol (A) and alcohol (B) with a polyhydric alcohol (C) of formula R"(OH)$_m$ to obtain said magnesium alkoxide compound. Preferred polyhydric alcohols, if used, are alcohols, wherein R" is a straight-chain, cyclic or branched C2 to C10 hydrocarbon residue and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides or a mixture of magnesium dihalide and a magnesium dialkoxide.

The solvent to be employed for the preparation of the present catalyst may be selected from among aromatic and aliphatic straight-chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particularly preferred.

The reaction for the preparation of the magnesium alkoxy compound may be carried out at a temperature of 40 to 70° C. The man skilled in the art knows how to select the most suitable temperature depending on the Mg compound and alcohol(s) used.

The transition metal (TM) compound of Group 4 to 6 as defined in IUPAC version 2013 is preferably a titanium compound, most preferably a titanium halide, like TiCl$_4$. The non-phthalic internal donor (ID) used in the preparation of the specific type of Ziegler-Natta catalyst used in the present invention is preferably selected from (di)esters of non-phthalic carboxylic (di)acids, 1,3-diethers, derivatives and mixtures thereof. An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives thereof and/or mixtures thereof. Preferred examples are e.g. substituted maleates and citraconates, most preferably citraconates. Here and hereinafter the term derivative includes substituted compounds.

In the emulsion-solidification method, the two phase liquid-liquid system may be formed by simple stirring and optionally adding (further) solvent(s) and/or additives, such as a turbulence minimizing agent (TMA) and/or an emulsifying agent and/or an emulsion stabilizer, like a surfactant, which are used in a manner known in the art. These solvents and/or additives are used to facilitate the formation of the emulsion and/or stabilize it.

Preferably, surfactants are acrylic or methacrylic polymers. Particularly preferred are unbranched C12 to C20 (meth)acrylates such as for example poly(hexadecyl)-methacrylate and poly(octadecyl)-methacrylate and mixtures thereof. The turbulence minimizing agent (TMA), if used, is preferably selected from polymers of α-olefin monomers with 6 to 20 carbon atoms, like polyoctene, polynonene, polydecene, polyundecene or polydodecene or mixtures thereof. Most preferable it is polydecene.

The solid particulate product obtained by the precipitation or emulsion—solidification method may be washed at least once, preferably at least twice, most preferably at least three times. The washing can take place with an aromatic and/or aliphatic hydrocarbon, preferably with toluene, heptane or pentane. Washing is also possible with TiCl$_4$ optionally combined with the aromatic and/or aliphatic hydrocarbon. Washing liquids can also contain donors and/or compounds of Group 13, like trialkyl aluminium, halogenated alky aluminium compounds or alkoxy aluminium compounds. Aluminium compounds can also be added during the catalyst synthesis. The catalyst can further be dried, for example by evaporation or flushing with nitrogen or it can be slurried to an oily liquid without any drying step.

The finally obtained specific type of Ziegler-Natta catalyst is desirably obtained in the form of particles having generally an average particle size range of 5 to 200 μm, preferably 10 to 100 μm. The particles are generally compact with low porosity and have generally a surface area below 20 g/m$^2$, more preferably below 10 g/m$^2$. Typically, the amount of Ti present in the catalyst is in the range of 1 to 6 wt.-%, the amount of Mg is in the range of 10 to 20 wt.-% and the amount of internal donor present in the catalyst is in the range of 10 to 40 wt.-% of the catalyst composition. A detailed description of the preparation of the catalysts used in the present invention is disclosed in WO 2012/007430, EP 2610271 and EP 2610272, which are incorporated herein by reference.

An external donor (ED) is preferably present as a further component in the polymerization process according to the invention. Suitable external donors (ED) include certain silanes, ethers, esters, amines, ketones, heterocyclic compounds and blends of these. It is especially preferred to use a silane. It is most preferred to use silanes of the general formula (I)

wherein R$^a$, R$^b$ and R$^c$ denote a hydrocarbon radical, in particular an alkyl or cycloalkyl group, and wherein p and q are numbers ranging from 0 to 3 with their sum (p+q) being equal to or less than 3. R$^a$, R$^b$ and R$^c$ can be chosen independently from one another and can be the same or different. Specific examples of silanes according to formula (I) are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$. Another most preferred silane is according to the general formula (II)

wherein $R^3$ and $R^4$ can be the same or different and represent a linear, branched or cyclic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl is used.

Generally, in addition to the Ziegler-Natta catalyst or the specific type of Ziegler-Natta catalyst and the optional external donor (ED) a co-catalyst (Co) shall be present in the polymerization process according to the invention. The co-catalyst is preferably a compound of group 13 of the periodic table (IUPAC, version 2013), such as for example an aluminum compound, e.g. an organo aluminum or aluminum halide compound. An example of a suitable organo aluminium compound is an aluminum alkyl or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Generally, the molar ratio between the co-catalyst (Co) and the external donor (ED) [Co/ED] and/or the molar ratio between the co-catalyst (Co) and the transition metal (TM) [Co/TM] is carefully chosen for each process. The molar ratio between the co-catalyst (Co) and the external donor (ED), [Co/ED] can suitably be in the range of 2.5 to 30 50.0 mol/mol, preferably in the range of 4.0 to 35.0 mol/mol, more preferably in the range of 5.0 to 30.0 mol/mol. A suitable lower limit can be 2.5 mol/mol, preferably 4.0 mol/mol, more preferably 5.0 mol/mol. A suitable upper limit can be 50.0 mol/mol, preferably 35.0 mol/mol, more preferably 30.0 mol/mol. The lower and upper indicated values of the ranges are included.

The molar ratio between the co-catalyst (Co) and the transition metal (TM), [Co/TM] can suitably be in the range of 20.0 to 500.0 mol/mol, preferably in the range of 50.0 to 400.0 mol/mol, more preferably in the range of 100.0 to 300.0 mol/mol. A suitable lower limit can be 20.0 mol/mol, preferably 50.0 mol/mol, more preferably 100.0 mol/mol. A suitable upper limit can be 500.0 mol/mol, preferably 400.0 mol/mol, more preferably 300.0 mol/mol. The lower and upper indicated values of the ranges are included.

Articles and Applications

The invention also relates to molded, preferably injection molded articles comprising the polypropylene composition according to the present invention. These articles are preferably characterized by a flexural modulus as determined in accordance with ISO 178 in the range of 500 to 1000 MPa, more preferably in the range of 550 to 950 MPa, most preferably in the range of 580 to 900 MPa. The articles are equally preferably characterized by a Charpy notched impact strength (NIS), determined in accordance with ISO 179/1eA at 23° C., of more than 20.0 kJ/m², more preferably in the range of 25.0 to 95.0 kJ/m², most preferably in the range of 30.0 to 85.0 kJ/m². The articles are further equally preferably characterized by a Charpy notched impact strength (NIS), determined in accordance with ISO 179/1eA at -20° C., of more than 6.0 kJ/m², more preferably in the range of 7.0 to 75.0 kJ/m², most preferably in the range of 7.5 to 70.0 kJ/m².

The invention further relates to packaging articles or automotive components having a wall thickness of at most 1.5 mm, like in the range of 0.1 to 1.5 mm, comprising the polypropylene composition according to the present invention. Such articles include packaging articles like cups, lids, trays, buckets and hinge-cup containers, but also automotive components like door claddings, armrests, center consoles, elements of dashboards and the like.

The invention also relates to the use of a polypropylene composition according to the present invention for producing a packaging article or automotive component and having a wall thickness of at most 1.5 mm in an injection molding process.

METHODS AND EXAMPLES

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene homo- and copolymers is determined at a temperature of 230° C. and a load of 2.16 kg. The $MFR_2$ of polyethylene as well as elastomeric ethylene/alpha-olefin random copolymers is determined at a temperature of 190° C. and a load of 2.16 kg.

Differential Scanning Calorimetry (DSC)

Differential scanning calorimetry (DSC) analysis, melting temperature (Tm) and melt enthalpy (Hm), crystallization temperature (Tc), and crystallization enthalpy (Hc) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (Tc) and heat of crystallization (Hc) are determined from the cooling step, while melting temperature (Tm) and melt enthalpy (Hm) are determined from the second heating step.

Xylene Cold Soluble (XCS)

Xylene Cold Soluble fraction at room temperature (XCS in wt.-%) is determined at 25° C. according to ISO 16152; 5th edition; 2005 Oct. 1.

Flexural Modulus

The flexural modulus is determined in 3-point-bending at 23° C. according to ISO 178 on 80×10×4 mm³ test bars injection moulded in line with EN ISO 1873-2.

Notched Impact Strength (NIS)

The Charpy notched impact strength (NIS) is measured according to ISO 179 1eA at +23° C. or −20° C., using injection moulded bar test specimens of 80×10×4 mm³ prepared in accordance with EN ISO 1873-2.

Hexane Soluble Fraction (C6 FDA)

The amount of hexane extractable polymer according to FDA method (federal registration, title 21, Chapter 1, part 177, section 1520, s. Annex B) was determined from films produced on a PM30 cast film extrusion line with about 220° C. melt temperature with L/D of 20 and a screw diameter of 30 mm (feed zone 4 D long, 5.8 mm deep, compression zone 10 D long, metering zone 6 D long, 2.3 mm deep utilising a screen pack 36-400-900-400 mesh/cm²). A 200 mm die with a 0.55 to 0.60 mm die gap, screw speed: 50 r/min, and chill roll temperature of water: both rolls 40° C. (heating-cooling unit), Air gap: 0.5 mm, Air knife blower air supply: 1 bar. The film thickness is 100 μm.

The amount of hexane soluble polymer is determined according to FDA method (federal registration, title 21, Chapter 1, part 177, section 1520, s. Annex B) from the film samples prepared as described above. The extraction was performed at a temperature of 50° C. and an extraction time of 2 hours.

Crystex Analysis
Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia, Spain).

A schematic representation of the CRYSTEX QC instrument is shown in FIG. 1a. The crystalline and amorphous fractions are separated through temperature cycles of dissolution at 160° C., crystallization at 40° C. and re-dissolution in a 1,2,4-trichlorobenzene (1,2,4-TCB) at 160° C. in a TREF column (column filled with inert material e.g. glass beads) as shown in FIG. 1b (see also Del Hierro, P.; Ortin, A.; Monrabal, B.; Soluble Fraction Analysis in Polypropylene, The Column Advanstar Publications, February 2014, Pages 18-23). Quantification of SF and CF and determination of ethylene content (C2) are achieved by means of an infrared detector (IR4) and an online 2-capillary viscometer, which is used for the determination of the intrinsic viscosity (IV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt.-% to 69 wt.-% (determined by 13C-NMR) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 Wt.-%.

The intrinsic viscosity (IV) of the parent EP copolymer and its soluble and crystalline fractions are determined with a use of an online 2-capillary viscometer and are correlated to corresponding IV's determined by standard method in decalin according to ISO 1628. Calibration is achieved with various EP PP copolymers with IV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

As shown in a FIGS. 1a and b, a defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt.-%] of the PP composition. During the second injection the soluble fraction (at low temperature) and the crystalline fraction (at high temperature) with the crystallization cycle are measured (wt.-% SF, wt.-% C2, IV). In this context, EP means ethylene propylene copolymer and PP means polypropylene.

Intrinsic Viscosity (Unless Determined in the Crystex Apparatus)

The intrinsic viscosity (IV) is measured according to DIN ISO 1628/1, October 1999, in Decalin at 135° C.

Comonomer Content (of the Neat Crystalline Matrix)

Quantitative infrared (IR) spectroscopy was used to quantify the ethylene content of the poly(ethylene-co-propene) copolymers through calibration to a primary method.

Calibration was facilitated through the use of a set of in-house non-commercial calibration standards of known ethylene contents determined by quantitative $^{13}$C solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt.-% produced at either pilot or full scale under a variety of conditions. The calibration set was selected to reflect the typical variety of copolymers encountered by the final quantitative IR spectroscopy method.

Quantitative IR spectra were recorded in the solid-state using a Bruker Vertex 70 FTIR spectrometer. Spectra were recorded on 25×25 mm square films of 300 μm thickness prepared by compression moulding at 180-210° C. and 4-6 mPa. For samples with very high ethylene contents (>50 mol %) 100 μm thick films were used. Standard transmission FTIR spectroscopy was employed using a spectral range of 5000-500 cm-1, an aperture of 6 mm, a spectral resolution of 2 cm$^{-1}$, 16 background scans, 16 spectrum scans, an interferogram zero filling factor of 64 and Blackmann-Harris 3-term apodisation.

Quantitative analysis was undertaken using the total area of the CH$_2$ rocking deformations at 730 and 720 cm$^{-1}$ ($A_Q$) corresponding to (CH$_2$)$_{>2}$ structural units (integration method G, limits 762 and 694 cm$^{-1}$). The quantitative band was normalised to the area of the CH band at 4323 cm$^{-1}$ ($A_R$) corresponding to CH structural units (integration method G, limits 4650, 4007 cm$^{-1}$). The ethylene content in units of weight percent was then predicted from the normalised absorption ($A_Q/A_R$) using a quadratic calibration curve. The calibration curve having previously been constructed by ordinary least squares (OLS) regression of the normalised absorptions and primary comonomer contents measured on the calibration set.

Poly(Propylene-Co-Ethylene)—Ethylene Content for Calibration Using $^{13}$C NMR Spectroscopy Quantitative $^{13}$C{$^1$H}NMR spectra were recorded in the solution-state using a Bruker Avance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}$C{$^1$H}NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E) The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regiodefects when needed. Integral regions were slightly adjusted to increase applicability across the whole range of encountered comonomer contents. The mole percent comonomer incorporation was calculated from the mole fraction: E [mol %]=100*fE. The weight percent comonomer incorporation was calculated from the mole fraction: E [wt.-%]=100* (fE*28.06)/((fE*28.06)+((1-fE)*42.08))

VOC and FOC (According to VDA278)

VOC

The VOC value is determined according to VDA 278 October 2011 from injection molded plaques. VDA 278 October 2011, Thermal Desorption Analysis of Organic Emissions for the Characterization of Non-Metallic Materials for Automobiles, VDA Verband der Automobilindustrie. According to the VDA 278 October 2011 the VOC value is defined as "the total of the readily volatile to medium volatile substances. It is calculated as toluene equivalent. The method described in this Recommendation allows substances in the boiling/elution range up to n-Pentacosane (C25) to be determined and analyzed."

FOG

The FOG value is determined according to VDA 278 October 2011 from injection moulded plaques. According to the VDA 278 October 2011 the FOG value is defined as "the total of substances with low volatility which elute from the retention time of n-Tetradecane (inclusive). It is calculated as hexadecane equivalent. Substances in the boiling range of n-Alkanes "C14" to "C32"are determined and analyzed."

EXAMPLES

Catalyst for First Heterophasic Propylene Copolymer (A)

The metallocene (MC) used was Anti-dimethylsilanediyl [2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride as disclosed in EP19177308.4 as ICS3.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurising with nitrogen using manual valves. Then toluene (22 kg) was added. The mixture was stirred for 15 min. Next 30 wt.-% solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.2% Al by weight.

Catalyst Preparation 30 wt.-% MAO in toluene (0.7 kg) was added into a steel nitrogen blanked reactor via a burette at 20° C. Toluene (5.4 kg) was then added under stirring. The MC as cited above (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9% Al and 0.11% Zr.

Catalyst for Second Heterophasic Propylene Copolymer (C)

For the preparation of the catalyst 3.4 litre of 2-ethyl-hexanol and 810 ml of propylene glycol butyl monoether (in a molar ratio 4/1) were added to a 20.0 l reactor. Then 7.8 litre of a 20.0% solution in toluene of BEM (butyl ethyl magnesium) provided by Crompton GmbH, were slowly added to the well stirred alcohol mixture. During the addition, the temperature was kept at 10.0° C. After addition, the temperature of the reaction mixture was raised to 60.0° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25.0° C. Mixing speed was adjusted to 170 rpm. 26.0 g of Mg-complex prepared above was added within 30 minutes keeping the temperature at 25.0° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25.0° C., after which the reactor temperature was raised to 90.0° C. within 30 minutes. The reaction mixture was stirred for a further 30 minutes at 90.0° C. Afterwards stirring was stopped and the reaction mixture was allowed to settle for 15 minutes at 90.0° C. The solid material was washed 5 times: washings were made at 80.0° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor

Wash 2: washing was made with a mixture of 30 ml of TiCl4 and 1 ml of donor.

Wash 3: washing was made with 100 ml of toluene.

Wash 4: washing was made with 60 ml of heptane.

Wash 5: washing was made with 60 ml of heptane under 10 minutes stirring.

Afterwards stirring was stopped and the reaction mixture was allowed to settle for 10 minutes while decreasing the temperature to 70° C. with subsequent siphoning, followed by N$_2$ sparging for 20 minutes to yield an air sensitive powder.

Polymerization

For the preparation of the inventive and comparative examples, four heterophasic propylene copolymers were polymerized in a Borstar PP type pilot plant with a pre-polymerization reactor, a liquid-phase loop reactor (Loop) and three gas phase reactors (GPR1, GPR2 and GPR3). The copolymers PP-A1 and PP-A2 have compositions according to the description of the first heterophasic propylene copolymer (A) and are based on a single-site catalyst system as outlined above. The copolymers PP-C1 and PP-C2 have compositions according to the description of the second heterophasic propylene copolymer (C) and are based on a Ziegler-Natta catalyst system as outlined above. For the latter system, dicyclopentyl-dimethoxysilane (donor D) was used as external electron donor and triethyl-aluminium as co-catalyst. The respective ratios as well as other polymerization conditions are given in Table 1 below.

TABLE 1

Polymerization conditions and copolymer properties

|  |  | PP-A1 | PP-A2 | PP-C1 | PP-C2 |
|---|---|---|---|---|---|
| Catalyst |  | SSC | SSC | ZNC | ZNC |
| Donor |  | — | — | D | D |
| Prepoly |  |  |  |  |  |
| Co/ED | mol/mol | 0 | 0 | 7.3 | 40 |
| Co/Ti | mol/mol | 0 | 0 | 220 | 230 |
| Temperature | ° C. | 25 | 20 | 30 | 30 |
| Residence time | min | 20 | 20 | 5 | 5 |
| Loop |  |  |  |  |  |
| Temperature | ° C. | 70 | 70 | 75 | 72 |
| Split | wt.-% | 49 | 57 | 30 | 30 |
| H2/C3 | mol/kmol | 0.40 | 0.45 | 14.8 | 18.8 |
| MFR | g/10 min | 60 | 109 | 55 | 110 |
| GPR1 |  |  |  |  |  |
| Temperature | ° C. | 70 | 80 | 80 | 80 |
| Split | wt.-% | 33 | 34 | 35 | 35 |
| H2/C3 | mol/kmol | 3.7 | 4.0 | 149.7 | 136.8 |
| C2/C3 | mol/kmol | 0.0 | 0.0 | 0.0 | 0.0 |
| MFR | g/10 min | 102 | 109 | 55 | 80 |
| MFR(GPR1) | g/10 min | 228 | 109 | 55 | 62 |
| XCS | wt.-% | 1.0 | 1.0 | 2.0 | 2.0 |
| C2 | wt.-% | 0.0 | 0.0 | 0.0 | 0.0 |
| GPR2 |  |  |  |  |  |
| Temperature | ° C. | 70 | 75 | 70 | 70 |
| C2/C3 | mol/kmol | 807 | 854 | 584.6 | 514.9 |
| H2/C2 | mol/kmol | 2.3 | 1.9 | 116.5 | 119.0 |
| Split | wt.-% | 18 | 9 | 20 | 17 |
| C2 | wt.-% | 4.1 | 1.9 | 8.5 | 7.9 |
| MFR | g/10 min | 43 | 90 | 11 | 15 |

TABLE 1-continued

Polymerization conditions and copolymer properties

|  |  | PP-A1 | PP-A2 | PP-C1 | PP-C2 |
|---|---|---|---|---|---|
| GPR3 |  |  |  |  |  |
| Temperature | ° C. | — | — | 85 | 85 |
| C2/C3 | mol/kmol | — | — | 585.2 | 1429 |
| H2/C2 | mol/kmol | — | — | 92.7 | 285.6 |
| Split | wt.-% | 0 | 0 | 15 | 18 |
| C2 | wt.-% | — | — | 13 | 18.9 |
| MFR | g/10 min | — | — | 11 | 18 |
| Pellet |  |  |  |  |  |
| XCS | wt.-% | 17.5 | 11.6 | 32.9 | 31.5 |
| C2(XCS) | wt.-% | 18.5 | 24.1 | 34.3 | 44.8 |
| iV(XCS) | dl/g | 2.4 | 2.5 | 3.6 | 2.3 |
| MFR | g/10 min | 43 | 90 | 11 | 18 |
| VB ratio | — | 1.0 | 1.0 | 1.0 | 1.2 |
| Tm | ° C. | 154 | 154 | 165 | 165 |
| Tc | ° C. | 114 | 114 | 116 | 115 |
| Crystex |  |  |  |  |  |
| SF | wt.-% | 18.1 | 10.6 | 31.3 | n.m. |
| C2 | wt.-% | 4.09 | 1.9 | 15.1 | n.m. |
| C2(SF) | wt.-% | 17.6 | 23.3 | 38.6 | n.m. |
| C2(CF) | wt.-% | 1.38 | 0 | 5.1 | n.m. |
| IV | dl/g | 1.43 | 1.22 | 2.1 | n.m. |
| IV(SF) | dl/g | 2.68 | 2.38 | 3.6 | n.m. |
| IV(CF) | dl/g | 1.13 | 1.07 | 1.5 | n.m. |

Melt Mixing of Compositions

The inventive compositions IE1 to IE4 and the comparative compositions CE2 to CE3 were prepared from the copolymers described above in combination with a commercial ethylene-octene plastomer corresponding to the elastomeric ethylene/alpha-olefin random copolymer (B) of the present invention. Said copolymer (B) is the plastomer Engage 8842 of DOW Chemical (USA) having a 1-octene content of 45 wt.-%, a density of 857 kg/m$^3$, a melt flow rate MFR$_2$ (as determined according to ISO 1133 at 190° C. and a load of 2.16 kg) of 1.0 g/10 min and an intrinsic viscosity (as determined according to DIN ISO 1628/1 in decalin at 135° C.) Of 2.60 dl/g.

The melt mixing step was performed in a Coperion ZSK57 twin-screw extruder with an L/D ratio of 45:1 and 0 of 57 mm using a temperature setting in the range of 200 to 240° C. During melt mixing, 0.2 wt.-% of Irganox B225 (1:1-blend of Irganox 1010 (Pentaerythrityltetrakis(3-(3',5'-di-tert.butyl-4-hydroxytoluyl)-propionate and tris (2,4-di-t-butylphenyl) phosphate) phosphite) of BASF AG, Germany) as stabilizers and 0.05 wt.-% calcium stearate as acid scavenger were added. The respective compositions as well as the properties of the inventive compositions IE1 to IE4 and the comparative compositions CE1 to CE3 are listed in Table 2.

TABLE 2

Compositions and properties

|  |  | IE1 | IE2 | IE3 | IE4 | CE1 | CE2 | CE3 |
|---|---|---|---|---|---|---|---|---|
| PP-A1 | wt.-% | 85 | 75 | 65 |  | 100 |  |  |
| PP-A2 | wt.-% |  |  |  | 75 |  |  | 100 |
| Plastomer B | wt.-% | 15 | 15 | 25 | 25 |  |  |  |
| PP-C1 | wt.-% |  |  | 10 | 10 |  |  |  |
| PP-C2 | wt.-% |  |  |  |  |  | 100 |  |
| MFR$_2$ | g/10 min | 28 | 25 | 19 | 36 | 43 | 18 | 88 |
| XCS | wt.-% | 29.8 | 31.4 | 39.7 | 33.7 | 17.5 | 31.5 | 11.6 |
| C2(XCS) | wt.-% | 25.5 | 27.1 | 31.7 | 34.3 | 18.5 | 44.8 | 24.1 |
| iV(XCS) | dl/g | 2.5 | 2.6 | 2.6 | 2.5 | 2.4 | 2.3 | 2.5 |
| Flexural modulus | MPa | 759 | 799 | 636 | 770 | 934 | 773 | 1138 |

TABLE 2-continued

Compositions and properties

|  |  | IE1 | IE2 | IE3 | IE4 | CE1 | CE2 | CE3 |
|---|---|---|---|---|---|---|---|---|
| Charpy NIS 23° C. | kJ/m$^2$ | 61.4 | 64.8 | 74.9 | 34.1 | 8.1 | 35.9 | 4.41 |
| Charpy NIS −20° C. | kJ/m$^2$ | 8.39 | 10.06 | 65.3 | 7.95 | 2.73 | 8.50 | 1.82 |
| VOC | µg/g | 32 | 49 | 47 | 36 | n.m. | 196 | n.m. |
| FOG | µg/g | 78 | 100 | 108 | 79 | n.m. | 367 | n.m. |

The inventive compositions not only exceed the mechanical property balance of the comparative compositions respectively the copolymers PP-A1, PP-A2 and PP-C2 while having a sufficiently high MFR$_2$ for producing thin-walled parts, the compositions also show lower emissions than PP-C2 as required.

The invention claimed is:

1. A polypropylene composition comprising
60 to 95 wt.-% of a first heterophasic propylene copolymer (A) comprising
78.0 to 92.0 wt.-% of a crystalline matrix (A1) being a propylene homo- or copolymer, said crystalline matrix corresponding to the crystalline fraction (CF) determined according to CRYSTEX QC method, ISO 6427-B and containing 0.0 to 2.0 wt.-% comonomer and
8.0 to 22.0 wt.-% of an amorphous propylene-ethylene elastomer (A2), optionally comprising C4-C12 alpha-olefin(s) as further comonomers, dispersed in said crystalline matrix (A1),
wherein (A1) and (A2) add up to 100 wt.-%, and wherein said amorphous propylene ethylene elastomer (A2) corresponds to the soluble fraction (SF) determined according to CRYSTEX QC method, ISO 6427-B and contains 15.0 to 30.0 wt.-% of comonomer,
said heterophasic propylene copolymer being characterised by a melt flow rate MFR$_2$, determined according to ISO1133 at 230° C. and a load of 2.16 kg, of 30 to 120 g/10 min, and
5 to 40 wt.-% of an elastomeric ethylene/alpha-olefin random copolymer (B) characterized by an MFR$_2$, determined according to ISO1133 at 190° C. and a load of 2.16 kg, of 0.1 to 100 g/10 min and a density in the range of 840 to below 900 kg/m$^3$,
wherein (A) and (B) add up to 100 wt.-%.

2. A polypropylene composition according to claim 1, further comprising 5.0 to 15.0 wt.-% of a second heterophasic propylene copolymer (C) characterised by a melt flow rate MFR$_2$, determined according to ISO1133 at 230° C. and a load of 2.16 kg, of 5 to 25 g/10 min and comprising a fraction soluble in cold xylene (XCS) in the range of 25.0 to 50.0 wt.-%.

3. A polypropylene composition according to claim 1, further comprising 5.0 to 30.0 wt.-% of a reinforcing mineral filler (D).

4. A polypropylene composition according to claim 1, having a melt flow rate MFR$_2$, determined according to ISO1133 at 230° C. and a load of 2.16 kg, of 10.0 to 100 g/10 min and comprises a fraction soluble in cold xylene (XCS) in the range of 20.0 to 50.0 wt.-%, said fraction having a content of comonomers selected from ethylene and/or C4-C12 alpha-olefin(s) in the range of 20.0 to 40.0 wt.-%.

5. A polypropylene composition according to claim 1, characterized by less than 100 µg/g of volatiles (VOC, VDA 278 October 2011) and less than 200 µg/g of semi-volatile organic condensables (FOG, VDA 278 October 2011).

6. A polypropylene composition according to claim 1, characterized in that the first heterophasic propylene copolymer (A) comprises
(A1) 79.0 to 91.0 wt.-% preferably 80.0 to 90.0 wt.-% of a crystalline matrix corresponding to the crystalline fraction (CF) determined according to CRYSTEX QC method, ISO 6427-B, said crystalline fraction (CF) containing 0.5 to 1.8 wt.-%, preferably 0.7 to 1.6 wt.-% of ethylene and having an Intrinsic Viscosity (IV) determined according to ISO1628 of 0.6 to 2.0 dl/g, preferably 0.8 to 1.8 dl/g, and
(A2) 9.0 to 21.0 wt.-% preferably 10.0 to 20.0 wt.-% of an amorphous propylene-ethylene elastomer dispersed in said crystalline matrix (A1), said propylene-ethylene elastomer corresponding to the soluble fraction (SF) determined according to CRYSTEX QC method, ISO 6427-B, containing 16.5 to 28.0 wt.-%, preferably 17.5 to 26.0 wt.-% of ethylene and having an Intrinsic Viscosity (IV) determined according to ISO1628 of 1.8 to 3.5 dl/g, preferably 2.0 to 3.2 dl/g,
wherein (A1) and (A2) add up to 100 wt.-%.

7. A polypropylene composition according to claim 1, characterized in that the first heterophasic propylene copolymer (A) has a melt flow rate MFR$_2$, determined according to ISO1133 at 230° C. and a load of 2.16 kg, of 35 to 110 g/10 min and/or a hexane-soluble fraction according to FDA method (C6FDA) in the range of 0.8 to 2.8 wt.-%, preferably in the range of 1.0 to 2.3 wt.-%.

8. A polypropylene composition according to claim 1, characterized in that the elastomeric ethylene/alpha-olefin random copolymer (B) is based on a solution polymerization process using a single-site catalyst and has a melt flow rate MRF$_2$, determined according to ISO1133 at 190° C. and a load of 2.16 kg, of 0.2 to 50 g/10 min and a density in the range of 850 to below 890 kg/m$^3$.

9. A polypropylene composition according to claim 1, characterized in that the reinforcing mineral filler is selected from talc, mica, wollastonite and calcium carbonate having a median particle size (D50) of 0.5-15 µm and a top cut (D95) of 1-50 µm.

10. A process for producing the polypropylene composition according to claim 1, comprising the following process steps:
(i) polymerizing the first heterophasic propylene copolymer (A) in a sequential polymerization process in the presence of a single-site catalyst system, and
(ii) melt-mixing said copolymer (A) with a suitable amount of an elastomeric ethylene/alpha-olefin random copolymer (B), (iii) optionally adding a suitable amount of the second heterophasic propylene copolymer (C) polymerized in the presence of a Ziegler-Natta type catalyst system as well as a suitable amount of a reinforcing mineral filler (D) in said melt-mixing step, followed by (iv) solidifying the resulting melt in a strand pelletization or underwater pelletization step.

11. A process according to claim 10, in which the single-site catalyst system for polymerizing the first heterophasic propylene copolymer (A) comprises an asymmetric metallocene catalyst complex and one or more co-catalysts.

12. A process according to claim 10, in which the Ziegler-Natta type catalyst system for polymerizing the second heterophasic propylene copolymer (C) comprises a self-supported Ziegler-Natta catalyst comprising a Magnesium compound, a Titanium compound and a non-phthalic internal electron donor (ID), a co-catalyst being an aluminum compound and an external donor (ED) being a silane.

13. An injection molded article comprising the f-polypropylene composition according to claim 1, being characterized by a flexural modulus as determined in accordance with ISO 178 in the range of 500 to 1000 MPa, a Charpy notched impact strength (NIS), determined in accordance with ISO 179/1 eA at 23° C., of more than 20.0 kJ/m² and a Charpy NIS, determined in accordance with ISO 179/1eA at −20° C., of more than 6.0 kJ/m².

14. A packaging article or automotive component comprising the polypropylene composition according to claim 1, and having a wall thickness of at most 1.5 mm.

15. An injection molding process for producing a packaging article or automotive component comprising the polypropylene composition according to claim 1, wherein the packaging article or automotive component has a wall thickness of at most 1.5 mm.

* * * * *